United States Patent
Emich

[15] 3,669,369
[45] June 13, 1972

[54] WINDING SHAFT
[72] Inventor: Georg Konrad Emich, Darmstadt, Germany
[73] Assignee: Maschinenfabrik Goebel GmbH, Darmstadt, Germany
[22] Filed: July 24, 1969
[21] Appl. No.: 844,267

[30] Foreign Application Priority Data
July 27, 1968   Germany....................P 17 74 616.6

[52] U.S. Cl............................................................242/56.9
[51] Int. Cl.........................................................B65h 19/04
[58] Field of Search..................242/56.9; 192/27, 38, 45, 55

[56] References Cited
UNITED STATES PATENTS
767,844    8/1904   Smith........................................192/27
3,279,571  10/1966  Wassilieff..................................192/38
3,322,361  5/1967   Young......................................242/56.9

FOREIGN PATENTS OR APPLICATIONS
11,998   1908   Great Britain.........................242/56.9

Primary Examiner—George F. Mautz
Attorney—Watson, Cole, Grindle & Watson

[57] ABSTRACT

Winding shaft with a plurality of lap creels and bushings or disks driven by a revolving shaft with anti-friction bearings in the form of needle bearings interposed between the lap creels and the bushings or disks.

2 Claims, 2 Drawing Figures

WINDING SHAFT

The invention relates to a winding or roll shaft with several lap creels or winding roll carriers, and in between, bushings or disks arranged on the shaft and driven by the revolving shaft which are pressed by an axial force against the lap creels, and as a result thereof, exert a torque on the latter. For the winding of thin and sensitive bands, only a slight torque may be transferred. The so-called friction used previously is not usable for this purpose; therefore, more recently anti-friction bearings have been arranged for such purposes between the driver and the lap creel, which transfer the torque created by the axial pressure.

In the case of known winding shafts of this type, the individual lap creels are each seated on two radial ball bearings so that, for the winding up of narrow bands, this arrangement is not suitable. In another known design, every lap creel is seated on one radial ball bearing which also fails to provide a transfer of the torque from the shaft to the lap creel since it becomes jammed, as in the case of the other design by the axially acting pressure force. Furthermore, still other designs are known wherein every lap creel is seated on only one ball bearing so that the balls of this bearing are pressed against the outside ring radially by conical rings. In this case, too, jamming occurs.

It is therefore an object of the invention to eliminate those disadvantages of the known lap arrangement and especially to make possible, a very delicate adjustment of the torque between the driver and the lap creel, even in the case of extraordinarily low torques. According to the invention, this is achieved with the use of anti-friction bearings, such as radially disposed needle bearings. The torque between the driver and the lap creel is brought about because of the extraordinarily low rolling friction of the needles between these parts and because of a minimum of gliding friction which develops be reason of the longitudinal axis of the needles being directed radially in relation to the shaft and one end of each needle in relation to its other end having diameters of the running circle of differing sizes. Because of this low friction, relatively large axial forces will cause only small torques between the winding shaft and the lap creel. Accordingly, a sensitive adjustment of the torque is made possible.

Also, the disks which are driven by the shaft may be designed as having cages for the needles.

Further objects of the invention will be apparent from the following description when considered in connection with the accompanying drawing showing one embodiment of the invention.

Figure 1:
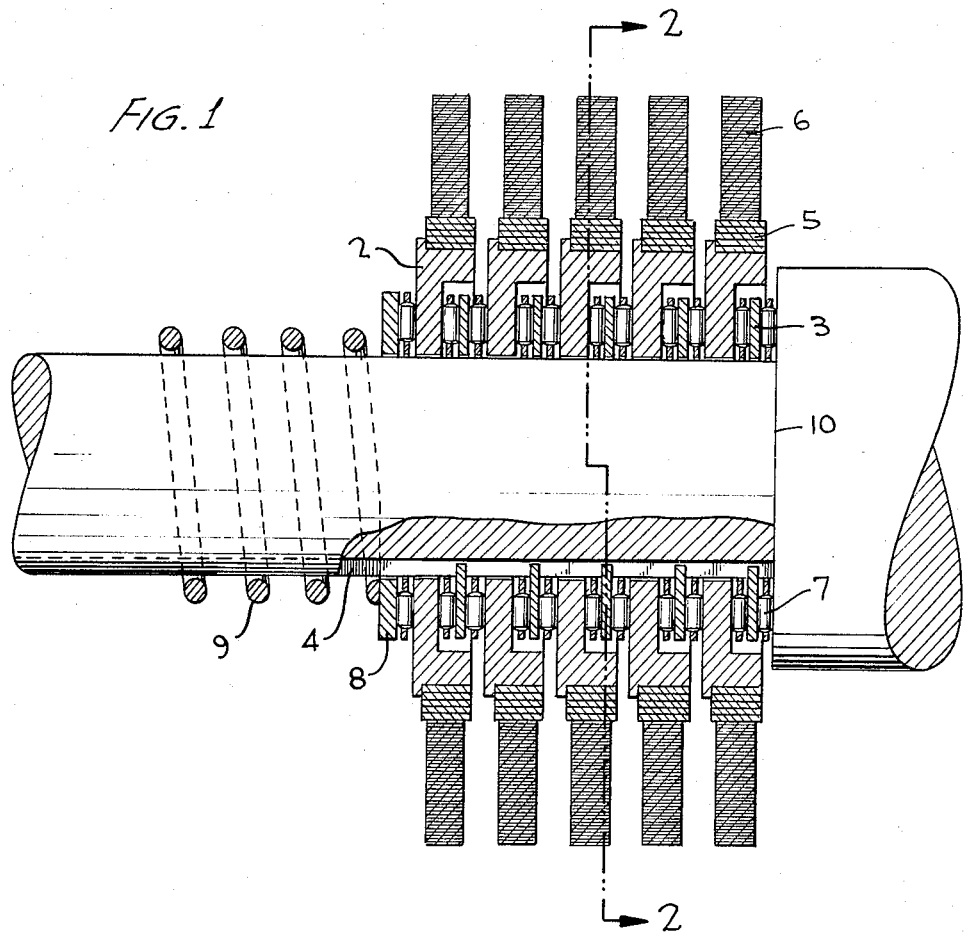
FIG. 1 shows a side view partly in section.

The winding shaft 1 has been mounted on one of its sides or ends, or on both sides, in a form or device not shown. On this shaft 1, lap creels or winding roll carriers 2 and disks or bushings 3 are seated axially and are freely slidable, the disks being driven by the shaft 1 during its rotation by reason of a projection at the inside edge of each disk engaging with the groove 4 of the shaft 1. On the other hand, creels 2 are seated loosely rotatably rotatably; on the shaft. On the creels 2, lap holders or winding sleeves 5 have been attached, onto which the rolls 6 are wound.

Between each driving disk 3 and the lap creels 2, adjoining both sides, a needle bearing, comprising needles or rollers, is disposed and is guided by a cage indicated in the drawing. All needles are disposed radially in relation to the rotational axis of the winding shaft 1 and contact the disk 3 on opposite sides thereof while further contacting the lap creel adjacent each disk.

For the production of the torque, pressure is applied against disk 8 in an axial direction such pressure being brought about for example by means of a spring 9 although this pressure may also be produced in some other manner. Accordingly, the needle bearings in contact with the disk 8 are pressed against the first lap creel which, in turn, presses against the adjacent lap creel, and so on.

The last needle bearing is supported by the collar or surface 10 of the shaft 1, so that all parts lying between this collar and disk 8 are under the effect of the same axial pressure or force which is converted in the manner already described into a torque on the individual lap creels.

Deviating from the design shown, the cages of each needle bearing can themselves be used as drivers. These disk-shaped cages will then require an equal inside projection as the disk 3. Instead of two needle bearings between two lap creels each, as in the design shown, only one needle bearing will then be provided between every two lap creels. Every needle of this bearing is then supported on one of its sides by one lap creel and on its other side by the other lap creel. This design can be of advantage especially whenever very narrow bands are to be wound up and the lap creels consequently must likewise be very narrow.

Figure 2:
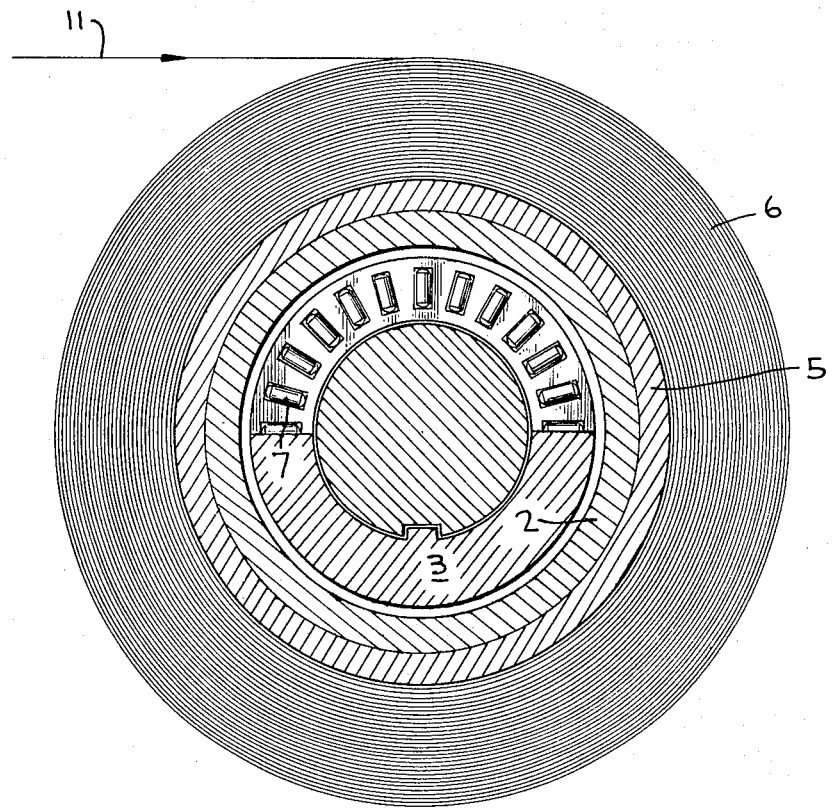
FIG. 2 shows a cross-sectional view taken on line 2—2 of FIG. 1 in the direction of the arrows.

Referring to FIG. 2 of the drawing, the band 11 to be wound comes from the left onto the roll 6 in the direction of the arrow to thus build up the roll. In the upper part of this drawing, the roll 6, the holding or winding sleeve 5, and a part of the creel 2 are shown. The needles 7 and their disk-like cages are also shown. In the bottom portion of this figure the disk 3 is also shown in section.

I claim:

1. A winding shaft comprising an axially rotatable shaft member, a plurality of spaced winding roll carriers freely mounted along the length of said shaft, a bushing being disposed adjacent each of said roll carriers and having means cooperating with said shaft so as to be rotated thereby, radially disposed needle bearings located in contact with said roll carriers and said bushings, and means for exerting a variable pressure in an axial direction against said bushings which in turn exert axial pressure against said roll carriers through said needle bearings whereby the torque of said rotatable shaft is transferred to said roll carriers to some variable extent.

2. The winding shaft according to claim 1 wherein each said bushing is located between a pair of needle bearings.

* * * * *